United States Patent Office 3,178,251
Patented Apr. 13, 1965

3,178,251
DYEING WITH HYDROXYETHYLAMINO-SULFON-YL-DIAMINO ANTHRAQUINONES AND AMINO-PLASTS
Arthur Buehler, Rheinfelden, Aargue, Alfred Fasciati, Bottmingen, and Georg Sulzer, Basel, Switzerland, assignors to Ciba Limited, Basel, Switzerland, a company of Switzerland
No Drawing. Filed June 13, 1962, Ser. No. 202,059
Claims priority, application Switzerland, June 21, 1961, 7,268/61
9 Claims. (Cl. 8—18)

It has been found that fibrous materials can be dyed or printed in an advantageous manner by applying thereto an aqueous preparation containing aminoplasts that are at least dispersible in water and as dyestuffs 1:4-diaminoanthraquinone in which at least one amino group is substituted by a benzene nucleus which itself carries a substituent which contains a hydroxyalkyl group, or acid esters of such hydroxyalkyl compounds with at least dibasic acids, the dyestuff molecule containing at least one acidic group imparting solubility in water, and the fibrous material so treated is then cured in the presence of an acid catalyst.

The present process is applicable to a wide variety of fibrous materials, such as leather, paper, glass fibers, and more especially to textile materials. Like acetyl-cellulose, polyamide, polyurethane, polyacrylonitrile or polyester fibers, the textile fibers may have been manufactured synthetically or semi-synthetically. The present process gives particularly good results in dyeing and printing materials made of cellulose fibers, for example fibers of regenerated cellulose such as viscose rayon, more especially staple rayon, or especially fibers of native cellulose such as linen or cotton.

The dyestuffs to be used in the present process must contain at least one acid group imparting solubility in water; this group may be linked directly with the anthraquinone nucleus or the benzene nucleus of the dyestuff and is preferably a sulfonic acid group. When the dyestuff molecule contains no further acid water-solubilizing group, said mandatory group may be in the form of a hydroxyalkyl group esterified with a polybasic acid, such as maleic, terephthalic, sulfosuccinic, orthophosphoric acid or more especially with sulfuric acid. It will be readily understood that the dyestuff molecule may also contain both types of acid solubilizing groups side by side, that is to say, for example, an acid ester group of an at least dibasic acid in addition to at least one aromatic bound sulfonic acid group.

Apart from a possibly present solubilizing group of the kind defined above and possible further substituents the anthraquinone nucleus contains in positions 1 and 4 an amino group each. One of these amino groups is substituted by a benzene nucleus which contains, in addition to other substituents possibly present, a substituent containing a hydroxyalkyl group. The carrier of the hydroxyalkyl group at the benzene nucleus may be, for example, a nitrogen atom in the form of an —NH— or

group, or advantageously an —SO$_2$— group or more especially an

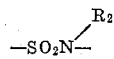

group, in which R$_2$ represents a hydrogen atom, an alkyl radical or a further hydroxyalkyl group. The hydroxyalkyl groups contain advantageously 2 to 3 carbon atoms and 1 to 2 hydroxyl groups, as is the case with the $\beta$:$\gamma$-dihydroxypropyl, the $\beta$-hydroxypropyl and the $\beta$-hydroxyethyl group. The second of the two amino groups may be substituted in the same manner, or it may contain other substituents, for example one or two alkyl groups or, more especially when there is a sulfonic acid group in the vicinal $\beta$-position of the anthraquinone nucleus, it may be a primary amino group.

The dyestuffs to be used in the present process correspond, for example, to the formula (1)

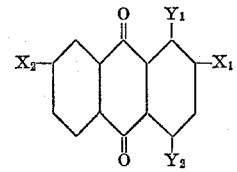

in which X$_1$ represents a hydrogen atom or a sulfonic acid group, X$_2$ a halogen atom such as bromine or chlorine, or a sulfonic acid group or preferably a hydrogen atom, and Y$_1$ and Y$_2$ represent amino groups of which at least one is substituted by a benzene radical which itself carries a substituent containing a hydroxyalkyl group. Thus, one of the two amino groups in positions 1 and 4 of the anthraquinone nucleus, or both amino groups, may be substituted by substituents of the formula (2)

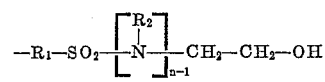

In this formula R$_1$ represents a monocyclic benzene radical, R$_2$ a hydrogen atom, or a lower alkyl group such as ethyl or methyl, or a $\beta$-hydroxyethyl group, and $n=1$ or 2.

Preferred use is made of the 1:4-diaminoanthraquinones of the formula (3)

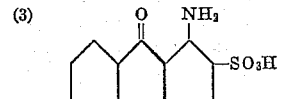

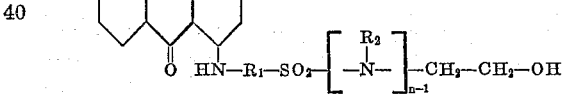

and more especially those of the formula (4)

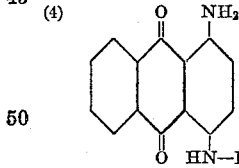

in which R$_1$ represents a monocyclic benzene radical, R$_2$ a hydrogen atom, or a lower alkyl radical or a $\beta$-hydroxyethyl group and $n=1$ or 2. The —NH— and the —SO$_2$— group may be, for example in para-position or preferably in meta-position relatively to each other and, as has been stated above, the benzene nucleus may contain further substituents so that the 1:4-diaminoanthraquinones correspond, for example, to the formula (5)

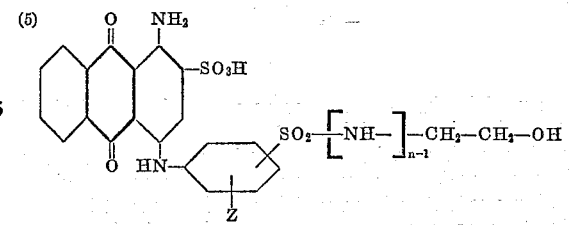

in which Z represents a hydrogen or a chlorine atom, a methyl group or a methoxy group, and $n=1$ or 2.

When the dyestuffs contain more than one hydroxyalkyl group, all or only some of the hydroxyalkyl groups may be esterified with polybasic acids.

Some of the dyestuffs to be used in the present process are known; the others can be manufactured by known methods.

The aqueous preparations to be used in the present process contain, apart from the dyestuffs, aminoplasts that are either dispersible in water—by themselves or if necessary with the aid of a dispersant—or are preferably soluble in water. The solubility in water of said aminoplasts need not be unrestricted and there are also suitable such aminoplasts as are uniformly soluble in water only in specific proportions.

In other respects, any aminoplast, or a mixture from which an aminoplast resin is formed, may be used. Preference is given to urea resins or melamine resins.

There are suitable, for example, urea-formaldehyde resins which may be derived from methylol ureas from 1 molecular proportion of urea and 2 to 4 molecular proportions of formaldehyde or from the alkyl ethers of said methylol compounds with lower alcohols such as methanol or n-butanol, and only some of the methylol groups present in the molecule need be etherified. As relevant examples there may be further mentioned methyl ethers of methylol-ethylene ureas and methylolacetylene ureas and their methyl ethers.

Further suitable are condensation products of formaldehyde with compounds which, like dicyandiamide or melamine, contain at least one atomic grouping of the formula

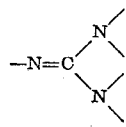

or which, like cyanamide, are easily converted into such compounds.

The formaldehyde condensation products to be used in the present process may be derived from a wide variety of cyclic or non-cyclic compounds containing the above-mentioned atomic grouping. As examples of non-cyclic compounds there may be mentioned dicyandiamide, dicyandiamidine, guanidine, acetoguanidine or biguanide. Suitable condensation products are, for example, those prepared with the use of more than 1 molecular proportion, for example 2 to 4 molecular proportions or more, of formaldehyde, referred to 1 molecular proportion of the compound containing at least one atomic grouping of the formula

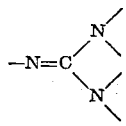

There may be used such condensation products as have been prepared in a neutral, alkaline or acidic medium.

The condensation products of formaldehyde and cyclic compounds containing at least one atomic grouping of the formula

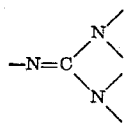

to be used in the present process are preferably derived from aminotriazines. There may be used methylol compounds of aminotriazines or their ethers or esters. Among said compounds there may be mentioned more especially reaction products of formaldehyde with 2:4:6-triamino-1:3:5-triazine, generally called melamine. Such condensation products may contain 1 to 6 methylol groups and are generally mixtures of different compounds. Further suitable are methylol compounds of such derivatives of melamine as contain at least one amino group, for example methylol compounds of melam, melem, ammeline, ammelide, or of halogen-substituted aminotriazines such as 2-chloro-4:6-diamino-1:3:5-triazine; furthermore methylol compounds of guanamines such, for example, as those of benzoguanamine, acetoguanamine or formoguanamine.

Furthermore, the present process may be performed with condensation products of formaldehyde with guanylmelamine; such condensation products may be derived from mono-, di- or triguanylmelamine or from mixtures thereof, such as are obtained when dicyandiamide is treated in an inert solvent at an elevated temperature with a hydrohalic gas and from the salts so formed the free amines are isolated by addition of strong alkalies. Substituted guanylmelamines are likewise suitable for the preparation of formaldehyde condensation products.

The salts of the formaldehyde condensation products, which may be used instead of the free basic condensation products, may be derived from inorganic acids, such as hydrochloric or sulphuric acid, or from organic acids, more especially from lower aliphatic acids, such as formic, acetic, propionic or glycollic acid. 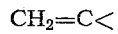

Apart from the aminoplasts, the aqueous preparations to be used in the present process may contain further substances, for example softeners for the textile material. For example, it is also possible to add a latex of a polymeric plastic. Particularly useful are latices that contain groups capable of being crosslinked with the aminoplasts. The polymers may be homopolymers or copolymers. They are advantageously derived from monomeric compounds containing the atomic grouping, $$CH_2=C<$$

for example from vinyl esters or organic acids, such as vinyl acetate, vinyl formate, vinyl butyrate, vinyl benzoate, or from vinylalkyl ketones, vinyl halides such as vinyl chloride, vinyl fluoride, vinylidene chloride, or from vinylaryl compounds such as styrene and substituted styrenes; also from compounds of the acrylic acid or methacrylic acid series, such as esters of acrylic acid and alcohols or phenols, for example ethyl acrylate, butyl acrylate or dodecyl acrylate. Other monomers suitable for making the polymers are acrylonitrile, acrylamide and derivatives substituted at the amide nitrogen atom; also analogous derivatives of methacrylic acid, α-chloracrylic acid, crotonic, maleic or fumaric acid, or acrylic or methacrylic acid itself; finally polymerisable olefines, such as isobutylene, butadiene, 2-chlorobutadiene, or heterocyclic compounds such as the different vinylpyridines. The manufacture of binary, ternary or even higher copolymers in emulsion form is known so that there is no need to deal with this matter in greater detail in this connection. A number of suitable copolymers are listed below:

(1) Copolymer from 50 parts of n-butyl acrylate, 44 parts of vinyl chloride and 6 parts of acrylic acid.
(2) Copolymer from 66 parts of n-butyl acrylate, 12 parts of styrene, and 22 parts of vinyl isobutyl ether.
(3) Copolymer from 64 parts of ethyl acrylate, 12 parts of styrene, 22 parts of vinyl isobutyl ether and 2 parts of acrylic acid.
(4) Copolymer from 70 parts of asymmetrical dichlorethane and 30 parts of butyl acrylate.
(5) Copolymer from 56 parts of butyl acrylate, 40 parts of vinyl chloride and 4 parts of acrylic acid.
(6) Copolymer from 50 parts of asymmetrical dichlorethane, 45 parts of butyl acrylate and 5 parts of acrylamide.
(7) Copolymer from 52 parts of vinyl chloride, 35 parts of butyl acrylate, 7 parts of methacrylate and 6 parts of acrylamide.

Likewise suitable are the commercial copolymers from styrene and butadiene, and from acrylonitrile and butadiene.

It goes without saying that the aqueous preparation may further contain one or more latex components in addition to one of several aminoplasts, for example a dispersed derivative, which is insoluble in water but soluble in organic solvents, of a formaldehyde condensation product of an amino compound which furnishes with formaldehyde curable resins and a water-soluble formaldehyde condensation product of an amino compound which furnishes with formaldehyde curable resins.

Finally, the aqueous preparation contains an acidic catalyst such as ammonium sulfate, ammonium chloride, diammonium phosphate, ethanolamine hydrochloride, magnesium chloride, zinc nitrate, zinc fluoborate or ammonium silicofluoride.

The aqueous preparations may be applied to the fibrous material in the known manner, advantageously at room temperature or at most at a moderately raised temperature, for example from 10 to 40° C. The process is particularly suitable for continous performance, for example for roller printing or padding fabrics.

The impregnating solutions may contain as further additives, for example wetting or dispersing agents. The printing pastes may further contain the conventional thickeners such as starches, tragacanth or methylcellulose, as well as further substances, for example hydrotropic products such as urea.

The proportions of the dyestuffs and aminoplasts, as well as of any concomitantly used assistants may vary within wide limits. The proportion of dyestuff depends substantially on the desired strength of the tint. The amount of aminoplast should in general not be less than that of the dyestuff, and as a rule it is of advantage to adjust the proportions so that the amount of aminoplast is several times that of the dyestuff, that is, to use preparations containing in 1000 parts about 20 to 200 parts of aminoplast.

After the preparation containing the dyestuff and the aminoplast, and the catalyst have been applied to the fibrous material, the whole is cured. It is of advantage to dry the material before curing it, advantageously at room temperature or by heating to a temperature at which as yet no substantial curing occurs, for example to a temperature below 100° C.

In the case of textile materials of regenerated cellulose it is in general advisable not to dry the dyeings or prints immediately after having applied the dyestuff preparation thereto but to allow them to lie in the moist state for some time, for example for 1 to 6 hours. In this way stronger and/or more even dyeings and prints are in general obtained.

The curing is advantageously performed in the usual apparatus, with or without nozzle device, by simple heating to the requisite temperature, for example to a temperature ranging from 120 to 210° C. Curing may alternatively be performed with infra-red rays. Depending on the effective heat very short curing times, for example from 10 to 30 seconds, may suffice. Finally, curing may also be performed without preliminary drying, in which case the drying and curing take place simultaneously.

Depending on the properties and the amount of aminoplast used, and depending on whether the aqeuous preparation contains further infredients, it is possible to produce by the present process additional effects, for example crease-resistance, shrinkage resistance, permanent calender effects, modifications of the handle of the textile material or its hydrophobisation.

To remove any unfixed dyestuff it is of advantage to soap the fibrous material in usual manner after curing, for example by a treatment at 40 to 80° C. in a solution which contain soap, or soap and sodium carbonate, or a synthetic detergent, for example an ethylene oxide adduct of a para-alkylphenol or sodium 2-heptadecyl-N-benzyl-benzimidazole disulfonate. The dyeings and prints obtained by the present process are distinguished by their good wet fastness properties, more especially by good fastness to washing.

Unless otherwise indicated, parts and percentages in the following examples are by weight.

*Example 1*

A mercerized cotton fabric is treated on a padder with an aqueous solution containing in 1000 parts by volume 20 parts of the dyestuff of the formula (6) 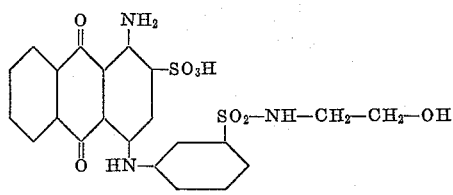

135 parts of an aqueous solution of 75% strength of highly methylated hexamethylolmelamine and 4 parts of ammonium chloride. The fabric is expresed until it shows a weight increase of 65%, dried in air at room temperature and then cured at 150° C. for 6 minutes. The fabric is then washed for 5 minutes at 50° C. in a solution containing per liter of water 2 grams of an adduct of 9 mols of ethylene oxide with 1 mol of nonylphenol and 2 grams of anhydrous sodium carbonate. The fabric is dyed a blue tint, and the dyeing is distinguished by good fastness to light and washing.

When there are further added to the padding liquor per 100 parts by volume 20 parts of aqueous polyethylene emulsion of 20% strength, the dyed fabric possesses a softer handle.

The above method is also suitable for dyeing cotton with the dyestuffs of the formulae shown below, and the resulting dyeings have good to very good fastness to washing:

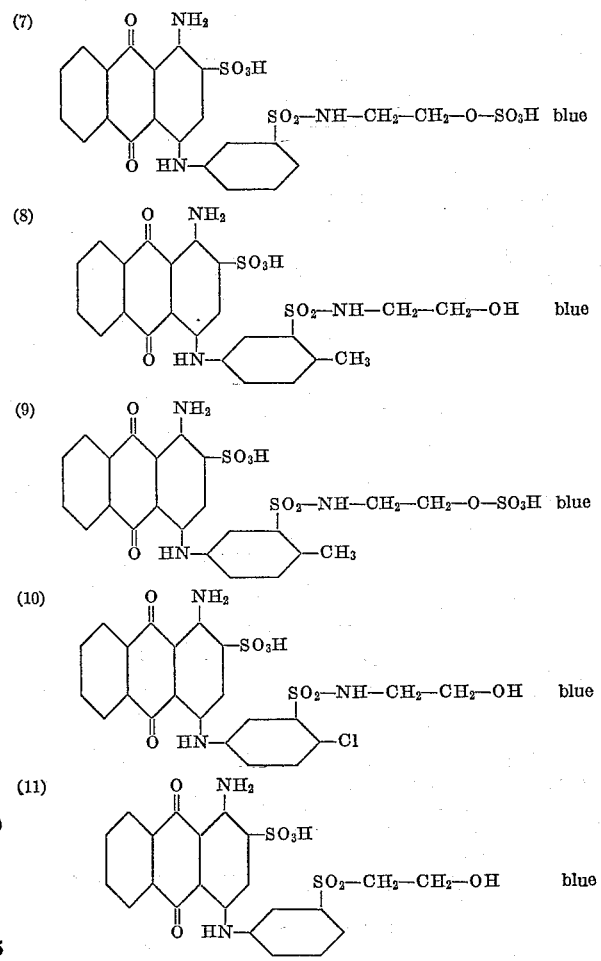

(12) 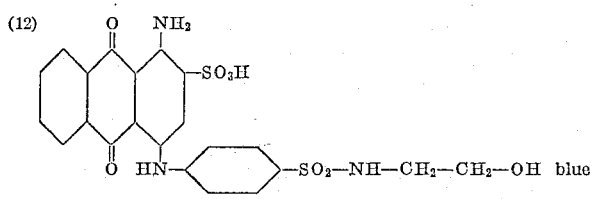 blue

(13) 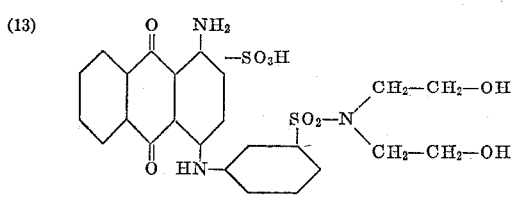 blue

(14) 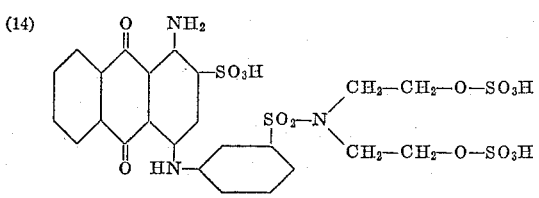 blue

(15) 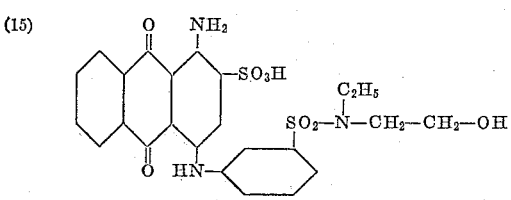 blue

(16) 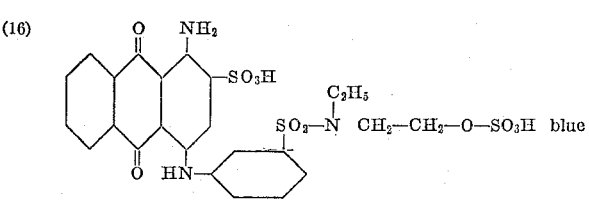 blue

(17) 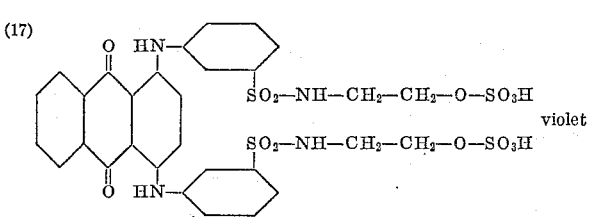 violet

(18) 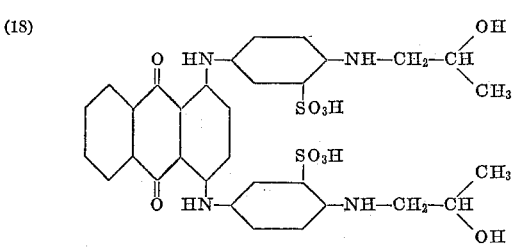 olive

*Example 2*

A bleached, mercerized cotton fabric (satin) is treated on a padder with an aqueous solution containing per 1000 parts by volume 30 parts of the dyestuff of the formula

(19) 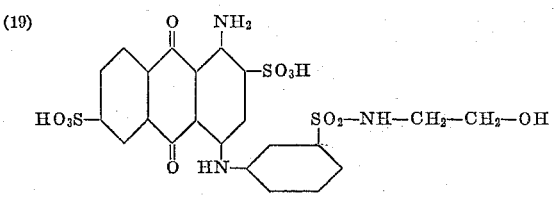

145 parts of an aqueous solution of 69% strength of highly methylated hexamethylolmelamine, 20 parts of an aqueous polyethylene emulsion of 20% strength and 4 parts of ammonium chloride. The fabric is expressed to a weight increase of 65%, predried at room temperature, finish-dried at about 60° C. and then cured for 6 minutes at 155 to 160° C. The fabric is then washed as described in Example 1. It is dyed a blue tint and the dyeing is fast to washing and light.

Instead of with the dyestuff of the Formula 19 the method described above may be performed with the dyestuff of the formula

(20) 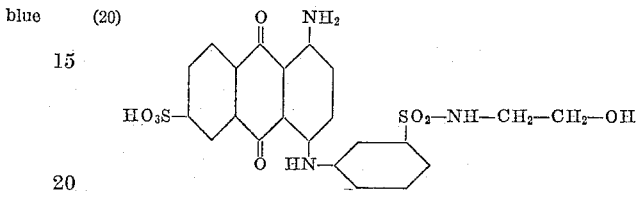

and the resulting blue dyeings are fast to light and washing.

*Example 3*

Cotton velvet is dyed as described in Example 2 with a preparation containing per 1000 parts by volume 22.5 parts of the dyestuff of the Formula 6 and 7.5 parts of copper phthalocyanine-3:4':4":4'''-tetrasulfonic acid. The resulting blue dyeing is fast to washing and light.

*Example 4*

The method described in Example 2 is performed with a padding liquor containing in 1000 parts 10 parts of the dyestuff of the Formula 8 and 15 parts of the 1:2-chromium complex of the dyestuff of the formula

(21) 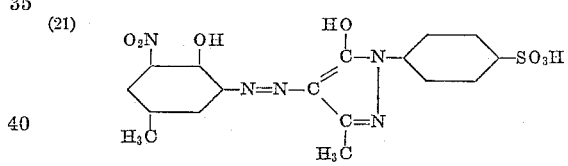

A violet dyeing is obtained which is fast to washing.

When the above dyestuff mixture is replaced by a mixture of 5 parts of the dyestuff of the Formula 6, 10 parts of the 1:2-chromium complex compound of the dyestuff of the Formula 21 and 15 parts of the dyestuff of the formula

(22) 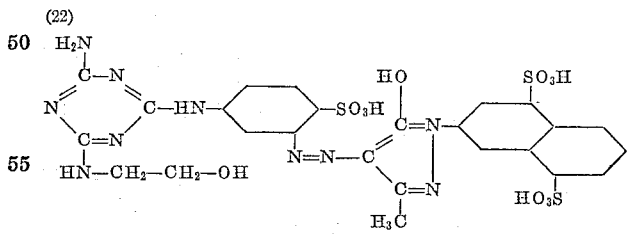

a brown dyeing is obtained which is fast to washing.

*Example 5*

A solution is prepared from 30 parts of the dyestuff of the Formula 8 with heating in 145 parts of an aqueous solution of 69% strength of highly methylated hexamethylolmelamine, 145 parts of water and 500 parts of isopropanol. This solution is mixed with a solution of 4 parts of ammonium chloride in 36 parts of water and 140 parts of isopropanol. A spun rayon fabric is impregnated with the resulting liquor on a padder at an elevated temperature, then expressed, while still moist wrapped in a plastic sheet and thus left to itself for half an hour. The fabric is then predried in air, finish-dried at about 60° C. and cured for 6 minutes at 155 to 160° C. The resulting level, strong, blue dyeing is fast to washing and the fabric has a soft handle.

Example 6

A spun rayon fabric is treated on a padder with an aqueous solution containing in 1000 parts by volume 30 parts of the dyestuff of the Formula 8. 145 parts of an aqueous solution of 69% strength of highly methylated hexamethylolmelamine, 20 parts of an aqueous polyethylene emulsion of 20% strength and 4 parts of ammonium chloride. The fabric is expressed, rolled up, wrapped in a plastic sheet and revolved for 6 hours in the moist state in this wrapping, then dried in air, calendered, cured for 40 seconds at 200° C. in a nozzle drier and finally washed as described in Example 1. A blue dyeing is obtained which is fast to washing. Storing the fabric in the moist state substantially intensifies the tint, increases the crease resistance in the dry and in the wet state, and produces a softer handle.

Example 7

The method described in Example 2 is performed, but using instead of a solution of highly methylated hexamethylolmelamine, in 1000 parts by volume padding liquor.

(a) 200 parts of an aqueous solution of 50% strength of a mixture of dimethylol-ethylene urea and hexamethylolmelamine hexamethyl ether in the ratio of 1:1, or (b) 200 parts of an aqueous solution of 50% strength of a mixture of 2 mols of dimethylolethyl tetrahydrotriazone and 1 mol of hexamethylolmelamine hexamethyl ether, or (c) 200 parts of an aqueous solution of 50% strength of methylolethylene urea.

It is of advantage to cure the padded fabric in a nozzle drier for 30 seconds at 200° C. The resulting blue dyeings are fast to washing.

Example 8

A mercerized, bleached cotton fabric (cotton poplin) is treated on a padder with an aqueous solution containing in 1000 parts by volume 30 parts of the dyestuff of the formula

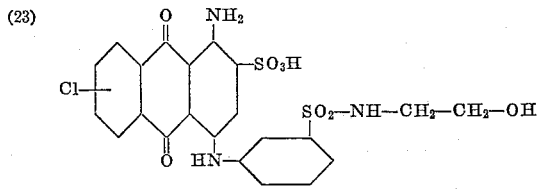

(23)

145 parts of an aqueous solution of 69% strength of highly methylated hexamethylolmelamine, 20 parts of an aqueous polyethylene emulsion of 20% strength and 4 parts of ammonium chloride. The fabric is expressed, dried in air, cured for 6 minutes at 155 to 160° C. and then washed for 30 minutes at 95° C. in a solution containing per liter of water 5 grams of soap and 2 grams of anhydrous sodium carbonate.

The resulting blue dyeing will withstand repeated washing and is very fast to light.

Example 9

A printing paste of the under-mentioned composition is manufactured, the lacquer benzine being stirred into the emulsion with the aid of a high-speed stirrer and the ammonium chloride solution being stirred in last.

| | Parts |
|---|---|
| Dyestuff of the Formula 8 | 50 |
| Urea | 50 |
| Water | 110 |
| An aqueous solution of 12% strength of an adduct of 80 mols of ethylene oxide with 1 mol of oleyl alcohol, cross-linked with hexamethylene diisocyanate | 60 |
| An aqueous dispersion containing 40% of copolymer of 48 parts of acrylic acid-n-butyl ester, 49.8 parts of acetic acid vinyl ester and 2.2 parts of acrylic acid, 0.5% of sodium α-hydroxyoctadecane sulphonate, 0.5% of an adduct of 30 mols of ethylene oxide with 1 mol of hydroabietyl alcohol, 59% of water | 50 |
| An aqueous polyethylene emulsion of 20% strength | 10 |
| An aqueous solution of 75% strength of a methylolmelamine methyl ether which contains per 1 melamine 4–5 methylol groups and 2–3 etherified methylol groups | 130 |
| Ammonia of 25% strength | 10 |
| Lacquer benzine | 500 |
| Turpentine oil | 10 |
| An aqueous ammonium chloride solution of 25% strength | 20 |
| | 1000 |

The above paste is used for roller-printing a mercerized cotton fabric which is then thoroughly dried and exposed for one minute to a temperature of 200° C. The fabric is thoroughly rinsed, first in cold water and then repeatedly in boiling water until the rinsing water remains perfectly colorless. The blue print obtained in this manner displays excellent fastness to washing, good fastness to rubbing, perspiration and dry-cleaning and satisfactory fastness to washing in the presence of chlorine.

What is claimed is:

1. A process for coloring fibrous material, which comprises applying to the fibrous material an aqueous preparation which contains (1) as a dyestuff a 1:4-diaminoanthraquinone in which at least one amino group is substituted by a benzene nucleus which itself carries a substituent containing a hydroxyalkyl aminosulfonyl group linked to the benzene nucleus through the sulfur, the dyestuff molecule containing at least one acidic group imparting solubility in water, and (2) an aminoplast that is at least dispersible in water, and then curing the fibrous material so treated in the presence of an acidic catalyst.

2. A process for coloring cellulosic fibers which comprises applying to the fibers an aqueous preparation which contains (1) as a dyestuff a 1:4-diaminoanthraquinone in which at least one amino group is substituted by a benzene nucleus which itself carries a substituent containing a hydroxyalkyl aminosulfonyl group linked to the benzene nucleus through the sulfur, the dyestuff molecule containing at least one acidic group imparting solubility in water and (2) a methylolated urea compound, and then curing the fibrous material so treated in the presence of an acidic catalyst.

3. A process for coloring cellulosic fibers which comprises applying to the fibers an aqueous preparation which contains (1) as a dyestuff a 1:4-diaminoanthraquinone in which at least one amino group is substituted by a benzene nucleus which itself carries a substituent containing a hydroxyalkyl aminosulfonyl group linked to the benzene nucleus through the sulfur, the dyestuff molecule containing at least one acidic group imparting solubility in water, and (2) a methylolated melamine compound, and then curing the fibers so treated in the presence of an acidic catalyst.

4. A process for coloring cellulosic fibers which comprises applying to the fibers an aqueous preparation which contains (1) as a dyestuff a 1:4-diaminoanthraquinone in which at least one amino group is substituted by a benzene nucleus which itself carries a substituent containing a hydroxyalkyl aminosulfonyl group linked to the benzene nucleus through the sulfur, the dyestuff molecule containing at least one acidic group imparting solubility in water, and (2) a methylated methylol melamine, and then curing the fibers so treated in the presence of an acidic catalyst.

5. A process for coloring cellulosic fibers which comprises applying to the fibers an aqueous preparation which contains (1) as a dyestuff a 1:4-diaminoanthraquinone of the formula

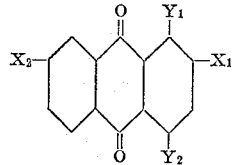

in which $X_1$ represents a member selected from the group consisting of a hydrogen atom and sulfonic acid group, $X_2$ represents a member selected from the group consisting of a hydrogen atom, a halogen atom and a sulfonic acid group, and $Y_1$ and $Y_2$ each represents an amino group of which at least one is substituted by a benzene nucleus which carries a substituent containing a hydroxyalkyl aminosulfonyl group linked to the benzene nucleus through the sulfur, and (2) a methylated methylol melamine, and then curing the fibers so treated in the presence of an acidic catalyst.

6. A process for coloring cellulosic fibers which comprises applying to the fibers an aqueous preparation which contains (1) as a dyestuff a 1:4-diaminoanthraquinone of the formula

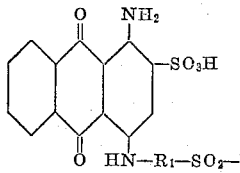

in which $R_1$ represents a monocyclic benzene radical and (2) a methylated methylol melamine, and then curing the fibers so treated in the presence of an acidic catalyst.

7. A process for coloring cellulosic fibers which comprises padding the fibers with an aqueous padding liquor which contains (1) the anthraquinone dyestuff of the formula

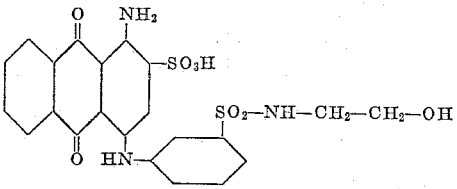

and (2) a highly methylated hexamethylol melamine, and then curing the fibers in the presence of ammonium chloride.

8. A process for coloring cellulosic fibers which comprises padding the fibers with an aqueous padding liquor which contains (1) the anthraquinone dyestuff of the formula

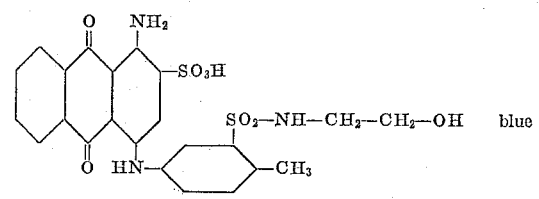

and (2) a highly methylated hexamethylol melamine, and then curing the fibers in the presence of ammonium chloride.

9. A process for coloring cellulosic fibers which comprises padding the fibers with an aqueous padding liquor which contains (1) the anthraquinone dyestuff of the formula

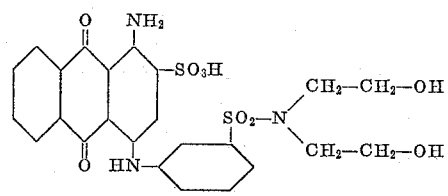

and (2) a highly methylated hexamethylol melamine, and then curing the fibers in the presence of ammonium chloride.

References Cited by the Examiner

UNITED STATES PATENTS

| | | | |
|---|---|---|---|
| 2,093,651 | 9/37 | Widmer | 8—54.2 |
| 2,670,265 | 2/54 | Heyna | 8—1.2 |
| 2,967,753 | 1/61 | Bitterli | 8—1.2 |
| 2,995,412 | 8/61 | Kleb | 8—39 |
| 3,046,075 | 7/62 | Kantner | 8—1.2 |
| 3,100,131 | 8/63 | Freyermuth | 8—41 |

FOREIGN PATENTS 846,505   8/60   Great Britain.

OTHER REFERENCES

Venkataramen: The Chemistry of Synthetic Dyes, vol. II, pp. 834–840, pub. by Academic Press Inc., New York, 1952.

Derwent Belgina Report No. 70A, pp. A2–A3, December 9, 1960.

Derwent Belgina Report No. 61A, January 31, 1960, pp. C–15–C16.

NORMAN G. TORCHIN, *Primary Examiner.*

MORRIS O. WOLK, *Examiner.*